United States Patent [19]

Scherner et al.

[11] Patent Number: 5,429,552
[45] Date of Patent: * Jul. 4, 1995

[54] AXIALLY AND ANGULARLY YIELDABLE TORQUE TRANSMITTING COUPLING WITH AIR COOLING SYSTEM

[75] Inventors: Helmut Scherner, Ibbendüren; Reinhard Wibbeling, Hörstel; Josef Schürhörster, Rheine, all of Germany

[73] Assignee: KTR Kupplungstechnik GmbH, Rheine, Germany

[ * ] Notice: The portion of the term of this patent subsequent to Jan. 17, 2012 has been disclaimed.

[21] Appl. No.: 768,370

[22] Filed: Sep. 27, 1991

Related U.S. Application Data

[63] Continuation-in-part of Ser. No. 683,485, Apr. 9, 1991, Pat. No. 5,382,194, which is a continuation of Ser. No. 512,099, Apr. 10, 1990, abandoned, which is a continuation of Ser. No. 268,174, Nov. 17, 1988, abandoned.

[30] Foreign Application Priority Data

Jan. 25, 1991 [DE] Germany ............... 9100835 U

[51] Int. Cl.⁶ ........................................ F16D 3/50
[52] U.S. Cl. .................................. 464/17; 464/92
[58] Field of Search .................... 464/17, 87–89, 464/91, 92, 96, 187, 153, 154, 158, 159, 162

[56] References Cited

U.S. PATENT DOCUMENTS

| | | | |
|---|---|---|---|
| 1,582,284 | 4/1926 | Leipert | 464/17 |
| 1,790,516 | 1/1931 | Williams | 464/17 |
| 2,361,226 | 10/1944 | Miner, Jr. et al. | 464/92 |
| 2,444,904 | 7/1948 | Worley | 464/92 |
| 2,699,656 | 1/1955 | Anderson et al. | 464/88 |
| 2,742,769 | 4/1956 | Gleeson et al. | 464/92 |
| 2,873,010 | 2/1959 | Alma | 464/92 X |
| 2,919,563 | 1/1960 | Grant | 464/17 |
| 3,678,708 | 7/1972 | Ernst et al. | 464/17 |
| 3,727,431 | 4/1973 | Yokel | 464/89 X |
| 3,823,577 | 7/1974 | Smith | 464/88 |
| 4,011,021 | 3/1977 | Hartz | 464/96 X |
| 4,385,893 | 5/1983 | Kirschey | 464/17 |
| 4,389,204 | 6/1983 | Walter | 464/91 |
| 4,563,166 | 1/1986 | Walter et al. | 464/92 X |
| 4,664,642 | 5/1987 | Kirschey | 464/96 |
| 4,708,514 | 11/1987 | Walter et al. | 464/92 X |
| 4,781,654 | 11/1988 | Walter et al. | 464/162 X |
| 4,790,791 | 12/1988 | Sumida et al. | 464/17 |

FOREIGN PATENT DOCUMENTS 924442  4/1982  U.S.S.R. ............. 464/17

*Primary Examiner*—Daniel P. Stodola
*Attorney, Agent, or Firm*—Darby & Darby

[57] ABSTRACT

An elastic axially and angularly yieldable torque transmitting coupling which can be installed between a driving unit and a driven unit has a flange receiving torque from the driving unit and a hub which serves to transmit torque to the driven unit. The hub has an annulus of spherical external teeth in mesh with an annulus of internal teeth on a sleeve-like plastic member of the flange. The flange further includes a plastic supporting member which receives torque from the driving unit and an elastomeric connector which is located between and is vulcanized to the two members. The flange and the hub define a chamber which is surrounded by the elastomeric connector and is ventilated to prevent overheating of the connector. The ventilating system includes a circular array of air-admitting openings in the sleeve-like member radially inwardly of the connector, and a circular array of air-evacuating openings which are provided in the connecting member radially outwardly of the air-admitting openings. The air-admitting openings are in direct communication with the chamber, and the chamber communicates with the air-evacuating openings through first channels in the supporting member and second channels in a washer-like centering element for the supporting member.

14 Claims, 5 Drawing Sheets

AXIALLY AND ANGULARLY YIELDABLE TORQUE TRANSMITTING COUPLING WITH AIR COOLING SYSTEM

CROSS-REFERENCE TO RELATED APPLICATIONS

This is a continuation-in-part of our commonly owned patent application Ser. No. 07/683,485 filed Apr. 9, 1991, now U.S. Pat. No. 5,382,194. The application Ser. No. 07/683,485 is a continuation of Ser. No. 07/512,099 filed Apr. 10, 1990 and now abandoned, and the application Ser. No. 07/512,099 is a continuation of Ser. No. 07/268,174, filed Nov. 17, 1988 and now abandoned.

BACKGROUND OF THE INVENTION

The invention relates to couplings in general, and more particularly to improvements in axially and angularly yieldable toothed plug-in elastic couplings for transmission of torque between rotary driving and driven units. Still more particularly, the invention relates to improvements in couplings of the type disclosed in the commonly owned copending patent application Ser. No. 07/683,485.

The copending patent application describes a coupling wherein a driven element (e.g., a hub) has an annulus of external teeth (particularly spherical teeth) which can be moved into and out of mesh with the internal teeth of a receiving portion. The latter has a substantially washer-like flange member which can be fastened to the output element of a driving unit, a substantially sleeve-like member which is provided with the annulus of internal teeth, and an elastomeric connector which is vulcanized or otherwise secured to the two members and permits such members to perform (within limits) tilting, axial and/or angular movements relative to each other.

When the flange is affixed to a driving unit and the external teeth of the hub mate with the internal teeth of the sleeve-like member, the hub and the receiving portion define a chamber which is substantially sealed from the surrounding atmosphere and wherein the temperature is apt to rise to a value at which the elastomeric material of the connector is likely to be affected to thus shorten the useful life of the receiving portion. Nevertheless, couplings of the above outlined character have found acceptance in various branches of the industry because they permit rapid connection of a driven unit to, and rapid disconnection of the driven unit from, a rotary driving unit. In addition, such couplings can damp vibrations and/or other stray movements in actual use, they enable the input element of the driven unit to move axially of the output element of the driving unit, and they also permit tilting as well as certain angular movements of the input and output elements relative to each other.

The aforediscussed heating of the elastomeric connector between the connecting and sleeve-like members of the receiving portion is attributable primarily to the fulling action upon the elastomeric material when the connector undergoes deformation in actual use of the coupling. If the coupling is relatively small, the ventilating action of air which penetrates into the chamber between the flange and the driven element of the coupling by flowing between the mating internal and external teeth is likely to suffice to prevent overheating of the connector. However, the situation is quite different if the coupling is relatively large, i.e., the connector is then heated to a temperature which suffices to cause premature aging and destruction of the connector because the fulling action is so pronounced that the relatively small quantity of atmospheric air which penetrates into the chamber between the mating internal and external teeth cannot ensure adequate cooling of the connector.

Attempts to overcome the aforediscussed drawbacks of presently known axially and angularly yieldable plug-in toothed elastic couplings include the drilling of holes into the assembled flange in order to admit additional quantities of relatively cool atmospheric air. Such proposals have met with limited success, and the making of holes into a finished receiving portion necessitates additional treatment in a drilling or like machine which contributes to the initial cost of the coupling. The holes are intended to permit escape of hot air from the chamber between the flange and the driven element of the coupling.

OBJECTS OF THE INVENTION

An object of the invention is to provide a toothed elastic plug-in coupling which is constructed and assembled in such a waif that each of its components which are likely to be subjected to a pronounced heating action is adequately cooled when the coupling is in actual use.

Another object of the invention is to provide a novel and improved receiving portion for use in the above outlined elastic coupling.

A further object of the invention is to provide a novel and improved cooling system for the receiving portion of the above outlined coupling.

An additional object of the invention is to provide a coupling wherein the receiving portion is adequately cooled as soon as the coupling is put to use and wherein one or more constituents of the receiving portion can be designed to prevent overheating of the receiving portion at the time such constituents are produced (e.g., mass produced in an extruding or other shaping machine).

Still another object of the invention is to provide a novel and improved internally toothed member for use in the receiving portion of the above outlined coupling.

A further object of the invention is to provide a novel and improved torque receiving supporting member for use in the receiving portion of the above outlined coupling.

Another object of the invention is to provide a novel and improved combination of driving and driven units wherein the transmission of torque from the output element of the driving unit to the input element of the driven unit takes place by way of the above outlined coupling.

An additional object of the invention is to provide a novel and improved method of effectively cooling the elastomeric and/or plastic constituents of the receiving portion in the above outlined coupling.

A further object of the invention is to provide a coupling whose useful life is longer than that of heretofore known couplings.

Another object of the invention is to provide a novel and improved method of expelling hot air from the chamber between the receiving portion and the driven element of the above outlined elastic plug-in coupling.

SUMMARY OF THE INVENTION

One feature of the invention resides in the provision of an elastic axially and angularly yieldable coupling for transmission of torque between driving and driven units, e.g., between an engine or a motor and a pump. The improved coupling comprises a hub or another suitable rotary element which is preferably separably connectable to one of the units (e.g., to the driven unit) and has an annulus of external teeth (particularly spherical teeth), and a receiving portion which is connectable to the other unit and includes a preferably annular flange member, a sleeve-like member having an annulus of internal teeth arranged to mesh with the external teeth of the rotary element, and at least one elastomeric connector which joins the two members. The flange and the rotary element define a chamber which is surrounded by the at least one connector and wherein the temperature of air is likely to rise when the coupling is in use, i.e., when the driving unit transmits torque to the driven unit. In accordance with a feature of the invention, the receiving portion comprises means for ventilating the chamber, and such ventilating means comprises at least one air-admitting opening in one of the members and at least one air-evacuating opening in the other member. The openings can be at least substantially parallel to the axis of rotation of the receiving portion.

It is presently preferred to employ supporting and sleeve-like members each of which is a shaped (e.g., extruded) plastic article. The openings of such members are preferably provided as a result of shaping of the respective plastic articles, i.e., the openings are not provided by a tool when the shaping of the respective members is already completed but are formed in the course of the article shaping operation.

In accordance with a presently preferred embodiment, the ventilating means comprises a substantially circular array of substantially equidistant air-admitting openings and/or an array of substantially equidistant air-evacuating openings.

In addition to the annulus of internal teeth, the sleeve-like member preferably further comprises a ring-shaped outer portion which is affixed (e.g., vulcanized) to the at least one connector, and a ring-shaped intermediate portion between the outer portion and the annulus of internal teeth. The at least one air-admitting opening or the circular array of air-admitting openings can be provided in the intermediate portion of the sleeve-like member.

The air-evacuating opening or openings are preferably provided in the flange member radially outwardly of the air-admitting opening or openings, and the ventilating means can further comprise means for communicatively connecting the air-evacuating opening or openings with the chamber. Such connecting means can comprise one or more channels in the flange member, particularly one channel for each air-evacuating opening or one channel for pairs of air-evacuating openings. Such coupling can further comprise a centering element for the flange member, and the connecting means can further comprise one or more channels in the centering element, particularly a discrete channel for each air-evacuating opening or for each pair of neighboring evacuating openings. Each channel of the centering element communicates with the chamber and with a channel of the flange member. The flange member has a first side which is adjacent the at least one connector and a second side which faces away from the at least one connector. The centering element is adjacent the second side of the flange member.

At least one of the two members has a substantially conical surface bounding the respective at least one opening. For example, each of the aforementioned circular array of air-admitting openings can be bounded by a conical surface. Such array can include a first group and a second group, and the openings of the first group preferably alternate with the openings of the second group. The axes of openings forming the first group can be inclined with reference to the axis of rotation of the receiving portion in a first direction, and the axes of openings of the second group can be inclined with reference to such axis of rotation in a second direction counter to the first direction.

Another feature of the invention resides in the provision of a method of making a rotary receiving portion for use in an axially and angularly yieldable torque transmitting coupling. The method comprises the steps of shaping a substantially washer-like flange member from a plastic material and simultaneously providing the flange member with at least one first opening, shaping a substantially sleeve-like member from a plastic material and simultaneously providing the sleeve-like member with at least one second opening, and bonding the two members to a ring-shaped elastomeric connector including placing the connector between and axially aligning the connector with the two members. The connector then surrounds a space which communicates with the first and second openings so that an air stream which is induced to flow into the space through the at least one opening of one of the two members can cool (when necessary) the elastomeric connector prior to leaving the space through the at least one opening of the other member.

The at least one first opening is located at a first radial distance from the axes of the two members, and the at least one second opening is preferably located at a different second radial distance from the axes of the two members.

The method can further comprise the step of providing at least one of the two members with a channel simultaneously with the step of providing the at least one member with the respective at least one opening. Such channel communicates with the aforementioned space upon completion of the bonding step, and such channel further communicates with the at least one opening of the at least one member so that a stream of air can flow into the space by flowing first through the at least one opening of the at least one member and thereupon through the channel, or from the space by flowing first through the channel and thereupon through the at least one opening of the at least one member.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 4:
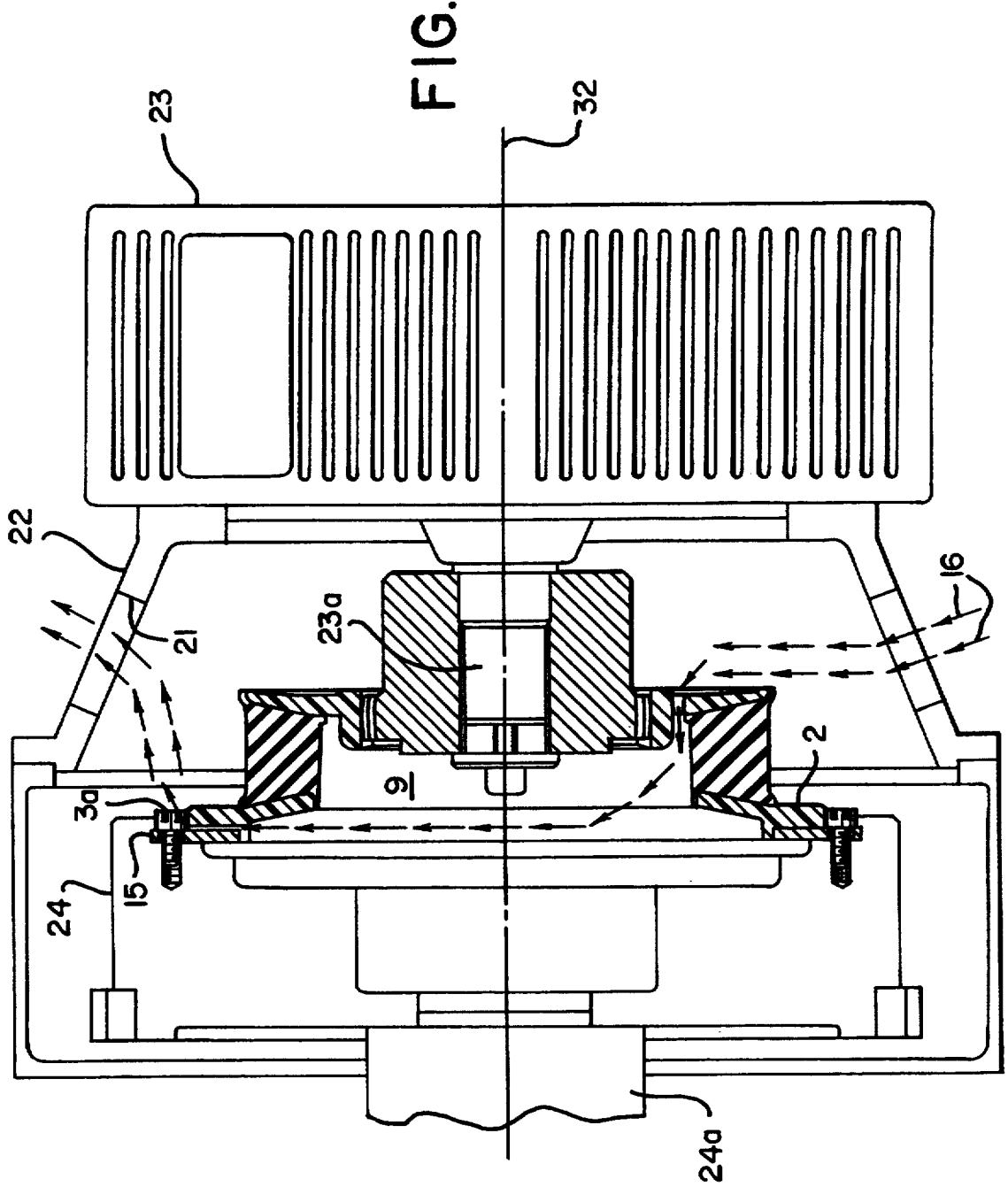
FIG. 4 is a smaller-scale substantially axial sectional view of the assembled coupling and further showing a portion of a rotary driving unit which is separably connected with the receiving portion and a driven unit which is connected with the driven element of the coupling.

The improved elastic axially and angularly yieldable plug-in toothed torque transmitting coupling comprises two main components, namely a receiving portion 1 (see particularly FIGS. 1 and 2), and a rotary driven element 8 here shown as a hub which can transmit torque to the input element 23a of a driven unit 23 (FIG. 4). The receiving portion 1 can receive torque from a driving unit (FIG. 4), e.g., a motor or engine having a rotary output element 24a for a flywheel 24.

The receiving portion 1 comprises a substantially washer-like flange member 2 which can be secured to the flywheel 24 by a set of screws 3a or by other suitable fasteners having shanks extending through axially parallel holes 3 at the periphery of the flange member 2. The receiving portion 1 further comprises a substantially sleeve-like member 4 having a radially inner portion provided with an annulus of internal teeth 6 which can be moved into and out of mesh with an annulus of spherical external teeth 7 (FIGS. 3 and 4) on the rotary driven element or hub 8, a ring-shaped intermediate portion 12 which surrounds the annulus of teeth 6, and a ring-shaped outer portion affixed (e.g., vulcanized) to an elastomeric connector 5 which joins the members 2 and 4. The members 2 and 4 can constitute shaped plastic articles which are mass-produced in an extruding or other suitable shaping machine of any known design. The connector 5 can be vulcanized or otherwise more or less permanently affixed to the flange member 2.

Figure 3:
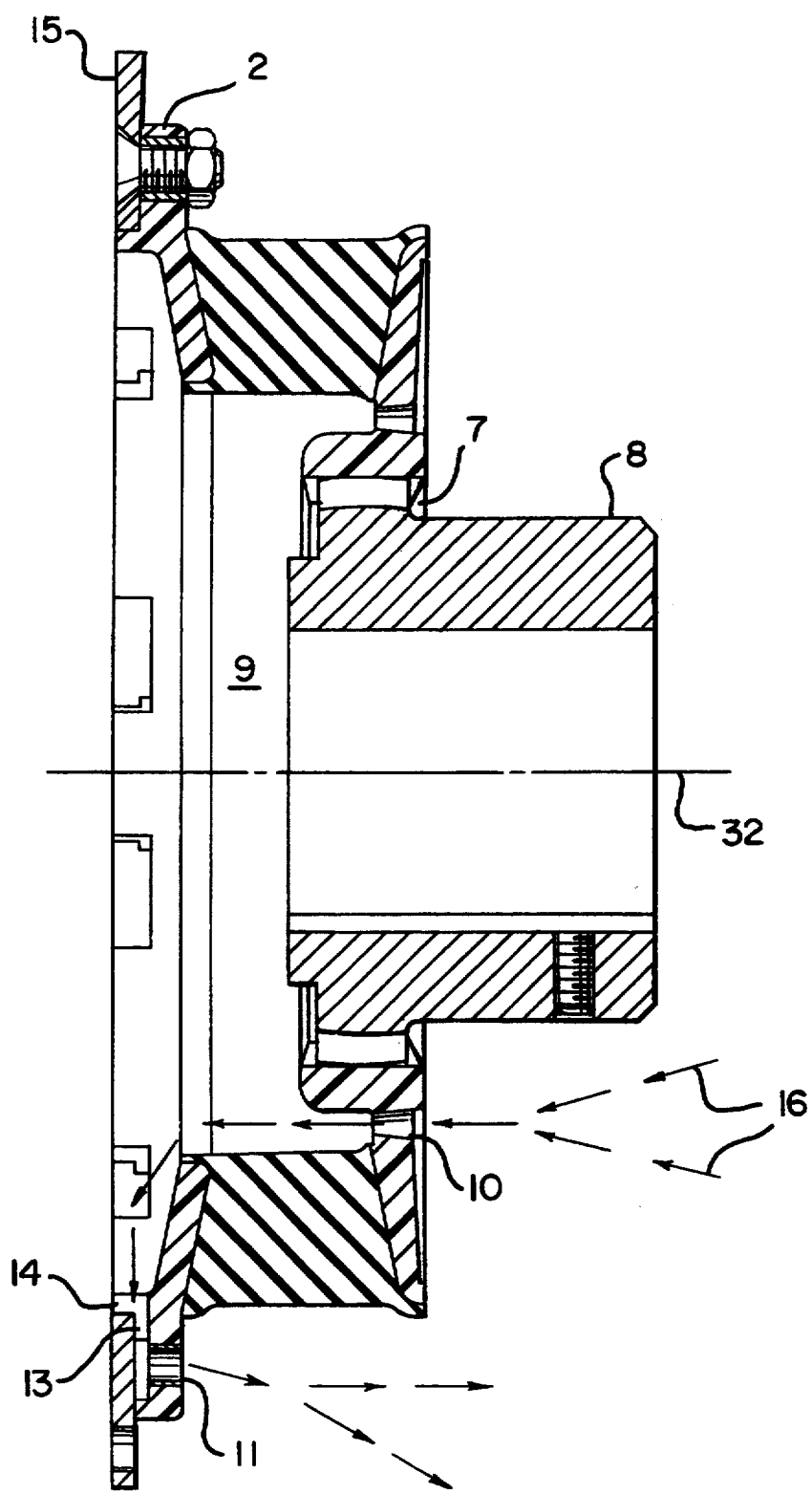
FIG. 3 is a substantially axial sectional view of the assembled coupling.

When the external teeth 7 of the hub 8 mate with the internal teeth 6 of the sleeve-like member 4 and the flange member 2 is affixed to the flywheel 24 of the driving unit, the parts 1 and 8 define a chamber 9 (see FIGS. 3 and 4 which is surrounded by the connector 5 and wherein, in the absence of any cooling action, the temperature is likely to rise when the driving unit including the flywheel 24 transmits torque to the input element 23a of the driven unit 23. The temperature in the chamber 9 could reach a value which would entail premature aging of elastomeric material of the connector 5 and would thus affect the operation of the coupling, namely the ability of the members 2 and 4 to perform axial and/or tilting as well as even some angular movements relative to each other.

In accordance with a feature of the invention, the receiving portion 1 is provided with a ventilating system which, in the illustrated embodiment, includes a circular array of air-admitting openings 10 in the intermediate portion 12 of the sleeve-like member 4, a circular array of air-evacuating openings 11 which are provided close to the periphery of the flange member 2 and can alternate in pairs with the holes 3 for the threaded fasteners 3a (see FIG. 2), and means for connecting the openings 11 with the chamber 9. The openings 10 are disposed radially inwardly of the openings 11 and are in direct communication with the chamber 9. An advantage of openings 10 which are located radially inwardly of the openings 11 is that fresh atmospheric air which enters the chamber 9 (i.e., the space which is surrounded by the connector 5) by flowing through the openings 10 in directions indicated by arrows 16 flows along the internal surface of the connector 5 (so that the latter exchanges heat with the flowing air), and the thus heated air is then acted upon by centrifugal force to flow radially outwardly toward and into the air-evacuating openings 11 of the member 2.

The means for communicatively connecting the openings 11 with the chamber 9 includes groove-like channels 13 (see particularly FIG. 2) provided in that side of the member 2 which faces away from the connector 5 (the other side of the member 2 is affixed, such as vulcanized, to the respective side of the connector 5). Each channel 13 communicates with at least one opening 11 and each such channel further communicates with at least one channel 14 (FIGS. 3 and 4) provided in the member 2 at a washer-like centering element 15 which overlies a portion of the respective side of the member 2 and abuts the adjacent side of the flywheel 24 when the latter is properly connected with the member 2. Each channel 14 communicates with the chamber 9 and with at least one channel 13 of the flange member 2.

Figure 1:
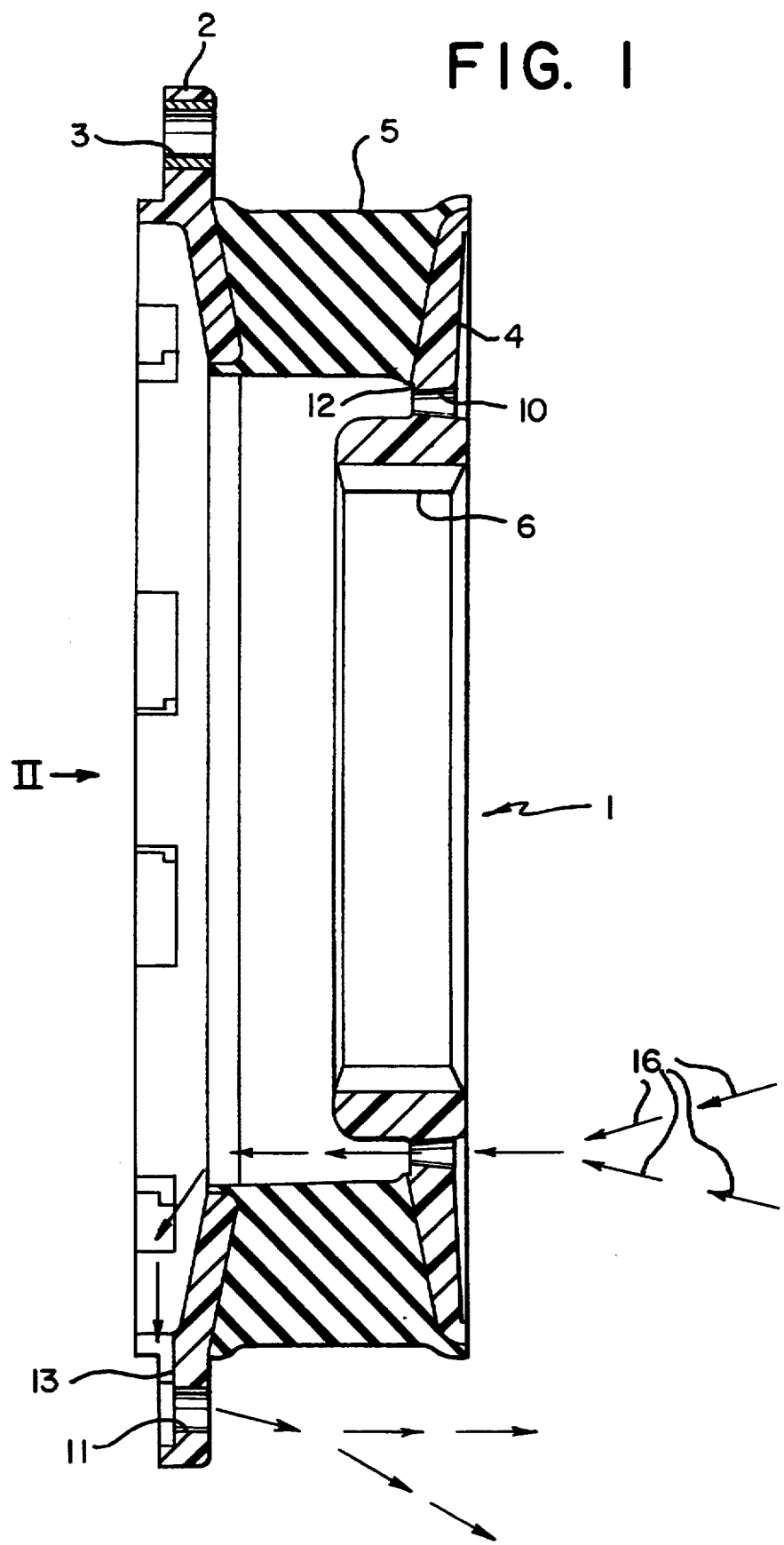
FIG. 1 is a substantially axial sectional view of a receiving portion which forms part of the improved coupling, the section being taken in the direction of arrows as seen from the line I—I in FIG. 2.
Figure 2:
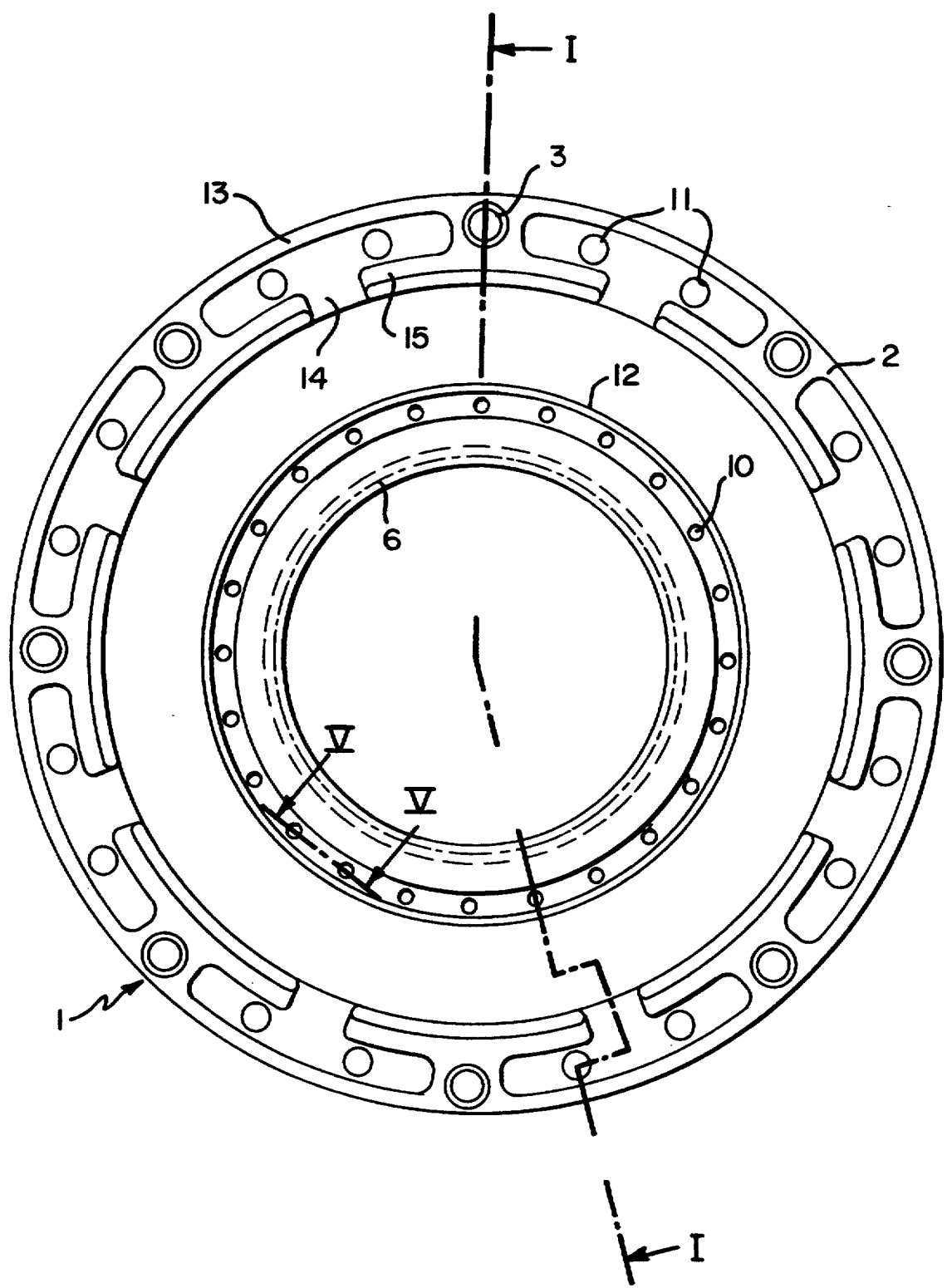
FIG. 2 is an elevational view of the receiving portion as seen in the direction of arrow II in FIG. 1.

When the improved coupling is in actual use, cool atmospheric air flows into and out of the chamber in directions indicated by the arrows 16 shown in FIGS. 1, 3 and 4 whereby the air cools all parts of the receiving portion 1 as well as the centering element 15 and thus prolongs the useful life of the elastomeric connector 5.

FIG. 4 shows that air which flows through the air-evacuating openings of the flange member 2 can enter a second chamber which is defined by an extension 22 of the housing of the driven unit 23 and from which hot air can escape into the atmosphere through slots and/or other suitable apertures 21 of the extension 22.

It is clear that the improved air-cooled coupling can be used with advantage for transmission of torque between driving and driven units of all kinds, not only between a motor or engine and a pump.

If the sleeve-like member 4 is made of a plastic material, the openings 10 are preferably formed during shaping of such plastic article, e.g., in an extruding machine in which the member 4 is formed. The same preferably holds true for the openings 3 and 10 and channels 13 if the flange member 2 is a plastic article, i.e., such openings and channels can be formed at the time the member 2 is shaped in an extruding or other suitable plastic processing machine. This ensures that the openings 10 and/or 11 need not be drilled and/or otherwise formed subsequent to the establishment of a vulcanized or other suitable connection between the elastomeric connector 5 on the one hand and the members 2 and 4 on the other hand.

Figure 5:
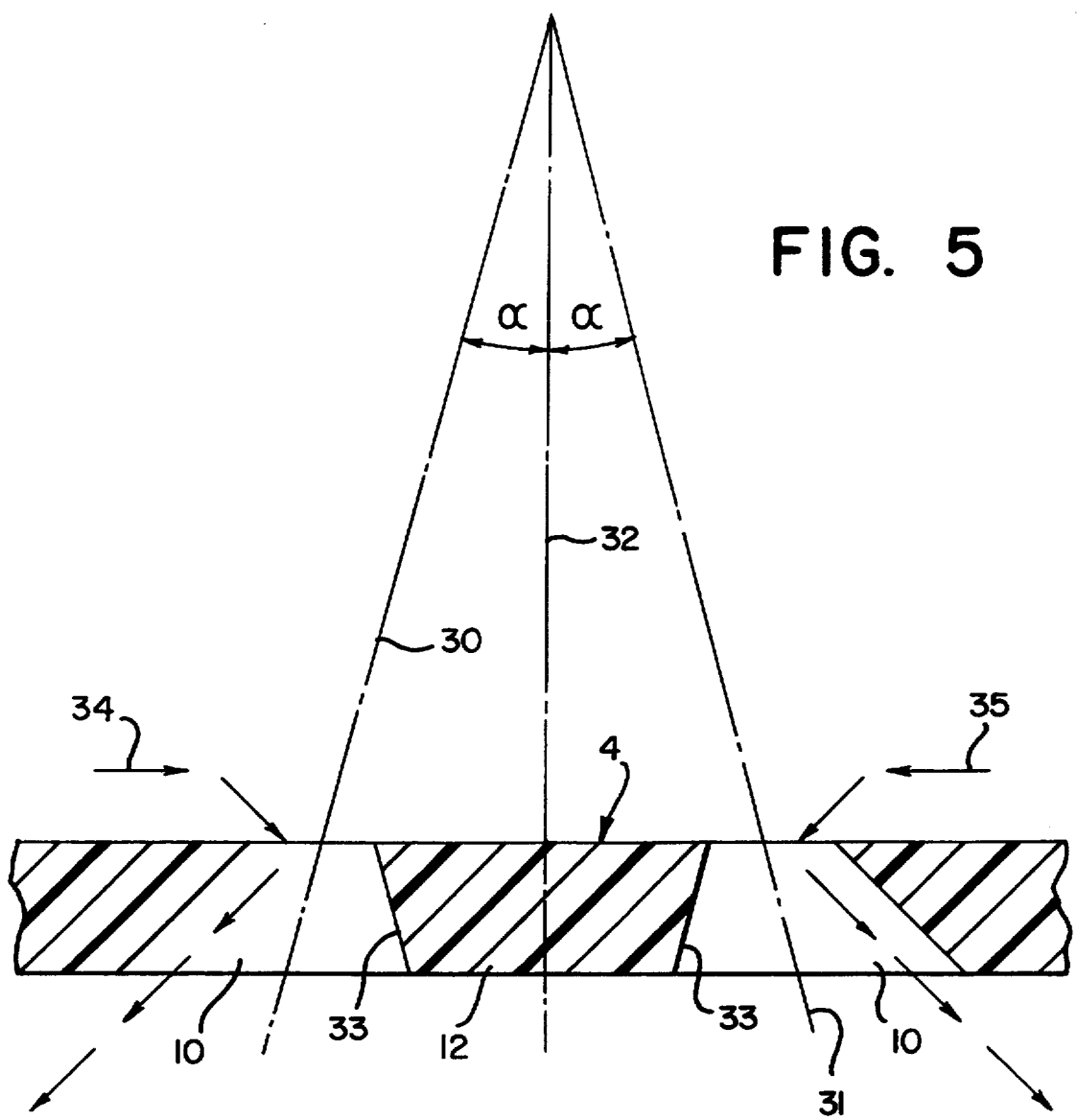
FIG. 5 is an enlarged fragmentary sectional view substantially as seen in the direction of arrows from the line V—V in FIG. 2.
Figure 6:
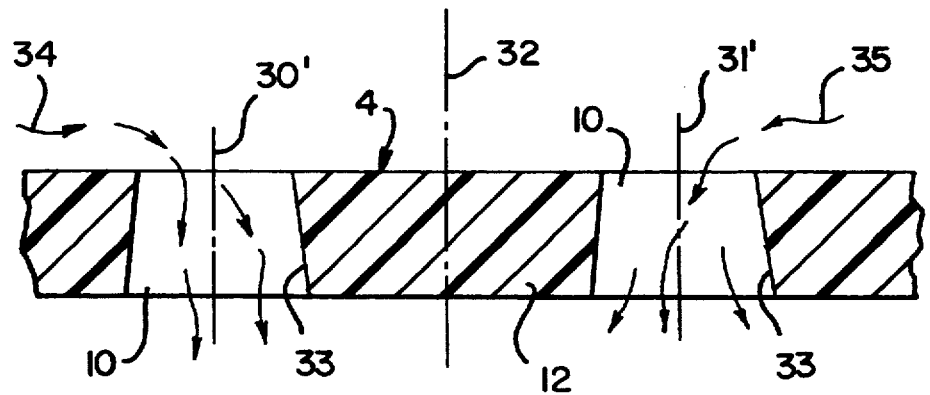
FIG. 6 is an enlarged fragmentary sectional view of an alternative embodiment of the present invention substantially as seen in the direction of arrows from the line V—V in FIG. 2.

FIG. 5 shows that the intermediate portion 12 of the sleeve-like member 4 can be provided with conical surfaces 33 which bound the air-admitting openings 10. The circular array of these openings preferably includes a first group of openings and a second group of openings which alternate with the openings of the first group (as seen in the circumferential direction of the annulus of internal teeth 6 on the member 4). The axis of rotation of the receiving portion 1 is shown at 32. The axes 30 of openings 10 of one group are inclined with reference to the axis 32 in a first direction (at an angle alpha), and the axes 31 of openings 10 of the other group are inclined relative to the axis 32 in a second direction (e.g., again at the angle alpha) counter to the first direction. The openings 10 of one group are effective to ensure highly satisfactory flow of cool air into the chamber 9 when the receiving portion 1 is caused to rotate in a first direction (arrow 34), and the openings of the other group are effective to ensure highly satisfactory flow of cool air into the chamber 9 when the receiving portion 1 is caused to rotate in a second direction (arrow 35) counter to the first direction. Alternatively, the openings can be at least substantially parallel to the axis of rotation, as shown in FIG. 6, wherein axes 30' and 31' are substantially parallel to the axis of rotation 32.

The openings 11 in the flange member 2 can also form two groups, and the openings of one group can alternate with the openings of the other group. Furthermore, the openings 11 can be inclined relative to the axis 32 in the same way as described for the openings 10 which are shown in FIG. 5. This enables the flange member 2 to act not unlike a suction generator, i.e., to draw heated air from the chamber 9 and to thus enhance the circulation of air in directions indicated by the arrows 16. Each air-evacuating opening 1 can be bounded by a conical surface, e.g., a conical surface of the type shown at 33 in FIG. 5.

The cooling system of the receiving portion 1 prolongs the useful life of the elastomeric connector 5 and of the entire flange. Moreover, the cooling system renders it possible to transmit substantial torque because the material of the connector 5 is not affected by heat when the coupling is in actual use. The cooling action improves as the rotational speed of the driving unit increases because the sleeve-like member 4 then draws larger quantities of cool atmospheric air so that the air can subject the constituents 2, 4 and 5 of the flange 1 to a more satisfactory cooling action.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An elastic axially and angularly yieldable coupling for transmission of torque between driving and driven units comprising a rotary element connectable to one of the units and having an annulus of external teeth; and a receiving portion connectable to the other of the units and including a flange member, a substantially sleeve-like member coaxial with said flange member and having an annulus of internal teeth arranged to mesh with said external teeth, and at least one elastomeric connector disposed axially between and joining said members, said receiving portion and said rotary element defining a chamber which is bounded by an internal surface of said at least one connector and said receiving portion having means for ventilating said chamber, said ventilating means comprising at least one air-admitting opening in one of said members and at least one air-evacuating opening in the other of said members, said openings communicating with said chamber and establishing path for the flow of air along said internal surface of said at least one connector said at least one air-admitting opening and said at least one air-evacuating opening being radially offset from each other.

2. The coupling of claim 1, wherein said receiving portion has an axis of rotation and said openings are at least substantially parallel to said axis.

3. The coupling of claim 1, wherein said members are shaped plastic articles and said openings are provided in said members as a result of shaping of the respective plastic articles.

4. The coupling of claim 1, wherein said ventilating means comprises a substantially circular array of substantially equidistant air-admitting openings in said one member.

5. The coupling of claim 1, wherein said ventilating means comprises a substantially circular array of at least substantially equidistant air-evacuating openings in said other member.

6. The coupling of claim 1, wherein said sleeve-like member further comprises a ring-shaped outer portion affixed to said at least one connector and a ring-shaped intermediate portion between said outer portion and said annulus of internal teeth, said ventilating means comprising a plurality of air-admitting openings in the intermediate portion of said sleeve-like member.

7. The coupling of claim 1, wherein said ventilating means comprises a plurality of air-evacuating openings in said flange member and means for communicatively connecting said air-evacuating openings with said chamber, said connecting means comprising channels in said flange member.

8. The coupling of claim 7, further comprising a centering element adjacent a first side of said flange member, said connecting means further comprising channels provided in said centering element and each communicating with said chamber and with one channel of said flange member.

9. The coupling of claim 8, wherein said flange member has a second side adjacent said at least one connector and said second side facing away from said at least one connector, said centering element being adjacent the first side of said flange member.

10. The coupling of claim 1, wherein at least one of said members has a substantially conical surface bounding the respective at least one opening.

11. The coupling of claim 1, wherein said receiving portion has an axis of rotation and said ventilating means comprises a substantially circular array of air-admitting openings in said one member, said one member having conical surfaces bounding said openings.

12. The coupling of claim 11, wherein the air-admitting openings of said array include a first group and a second group, said air-admitting openings having axes which are inclined relative to the axis of rotation of said receiving portion, the axes of openings of said first group being inclined with reference to said axis of rotation in a first direction and the axes of openings of said second group being inclined with reference to said axis of rotation in a second direction counter to said first direction.

13. The coupling of claim 12, wherein the openings in said first group alternate with the openings of said second group in the direction of rotation of said receiving portion.

14. The coupling of claim 1, wherein said receiving portion has an axis of rotation and said at least one air-admitting opening is disposed at a first distance from said axis, said at least one air-evacuating opening being disposed at a greater second distance from said axis.

* * * * *